(12) United States Patent
Biais

(10) Patent No.: US 7,498,711 B2
(45) Date of Patent: Mar. 3, 2009

(54) COOLING OF A STATOR

(75) Inventor: François Biais, Chatou (FR)

(73) Assignee: Thales (FR)

( * ) Notice: Subject to any disclaimer, the term of this patent is extended or adjusted under 35 U.S.C. 154(b) by 0 days.

(21) Appl. No.: 10/564,086

(22) PCT Filed: Jul. 2, 2004

(86) PCT No.: PCT/EP2004/051337

§ 371 (c)(1),
(2), (4) Date: Jan. 11, 2006

(87) PCT Pub. No.: WO2005/015710

PCT Pub. Date: Feb. 17, 2005

(65) Prior Publication Data

US 2006/0163954 A1    Jul. 27, 2006

(30) Foreign Application Priority Data

Jul. 11, 2003    (FR) .................................. 03 08559

(51) Int. Cl.
    *H02K 3/48* (2006.01)
(52) U.S. Cl. ......................................... 310/214; 310/52
(58) Field of Classification Search ................. 310/214, 310/215, 216, 52, 54, 58, 64
    See application file for complete search history.

(56) References Cited

U.S. PATENT DOCUMENTS

| | | | | |
|---|---|---|---|---|
| 3,229,130 A | * | 1/1966 | Drouard ...................... | 310/54 |
| 3,963,950 A | * | 6/1976 | Watanabe et al. ............. | 310/54 |
| 4,227,108 A | * | 10/1980 | Washizu et al. ............. | 310/214 |
| 4,908,347 A | | 3/1990 | Denk | |
| 4,994,700 A | * | 2/1991 | Bansal et al. ............... | 310/215 |
| 5,519,269 A | | 5/1996 | Lindberg | |
| 5,670,838 A | | 9/1997 | Everton | |
| 6,713,927 B2 | * | 3/2004 | Kikuchi et al. .............. | 310/214 |

FOREIGN PATENT DOCUMENTS

GB         2 145 882 A  *  4/1985

* cited by examiner

*Primary Examiner*—Hanh N Nguyen
(74) *Attorney, Agent, or Firm*—Lowe Hauptman Ham & Berner, LLP

(57) ABSTRACT

The invention relates to the cooling of a stator (3) of an electric machine (1), the stator (3) comprising an autonomous cooling circuit, that is to say distinct from another cooling circuit such as that of a rotor of the electric machine (1), for example. The invention is particularly suitable for cooling an electric machine operating at high temperature and cooled by oil circulation. According to the invention, a fluidtight shell (9) is sandwiched in the magnetic circuit (7, 8). This shell (9) is subjected to considerably fewer mechanical stresses than a shell placed in the gap (25) of the electric machine (1).

20 Claims, 2 Drawing Sheets

COOLING OF A STATOR

The invention relates to the cooling of a stator of an electric machine, the stator comprising an autonomous cooling circuit, that is to say distinct from another cooling circuit such as that of a rotor of the electric machine, for example. The invention is particularly suitable for cooling an electric machine operating at high temperature and cooled by oil circulation. The temperature of the oil is, for example, between 100 and 140° C. The cooling circuit must be sealed between the oil-immersed stator and the rotor assembly at the location of a gap separating the rotor from the stator.

Sealing has been provided for the cooling circuit by means of a fluidtight shell fixed to the stator and arranged in the gap. This type of sealing provision entails numerous constraints. It is absolutely essential for the shell, situated in the gap, to be electrically non-conductive so as not to produce losses which would be detrimental. It must be as thin as possible since it either constitutes an additional electromagnetic gap (if it is non-magnetic) or it increases magnetic leakage (if it is magnetic). Finally, it must provide oil sealing over the whole length of the machine. Its outer face is exposed to the relatively low temperature of the oil circulating in the stator, but its internal face is exposed to the high temperature of the air present in the gap. The shell must have sufficient mechanical properties to withstand this high temperature gradient and also to retain its dimensions and not deform in the gap. All of these constraints may be summarized to the production of a thin fluidtight cylindrical shell using an electrically non-conductive material capable of withstanding these high temperatures without deforming.

The object of the invention is to simplify the production of the shell while eliminating a large number of the constraints mentioned above. To this end, the subject of the invention is a stator of an electric machine comprising an autonomous cooling circuit, means for sealing the cooling circuit with respect to a rotor of the electric machine, a magnetic circuit comprising slots, and a winding arranged in the slots, characterized in that the sealing means comprise a fluidtight shell sandwiched in the magnetic circuit.

The invention finds particular utility in electric machines requiring high leakage inductance. For example, when the machine is an alternator, the leakage inductance makes it possible to reduce the short-circuit current in the event of a fault. To increase the leakage inductance, slots are produced which are deeper than required for filling the winding in the slots. The shell may then be sandwiched inside the magnetic circuit and the whole of the winding may nevertheless be arranged outside the shell and thus be cooled by the cooling circuit.

The invention will be better understood and other advantages will emerge on reading the detailed description of an embodiment of the invention given by way of example, the description being illustrated by means of the appended drawing, in which.

Figure 1:
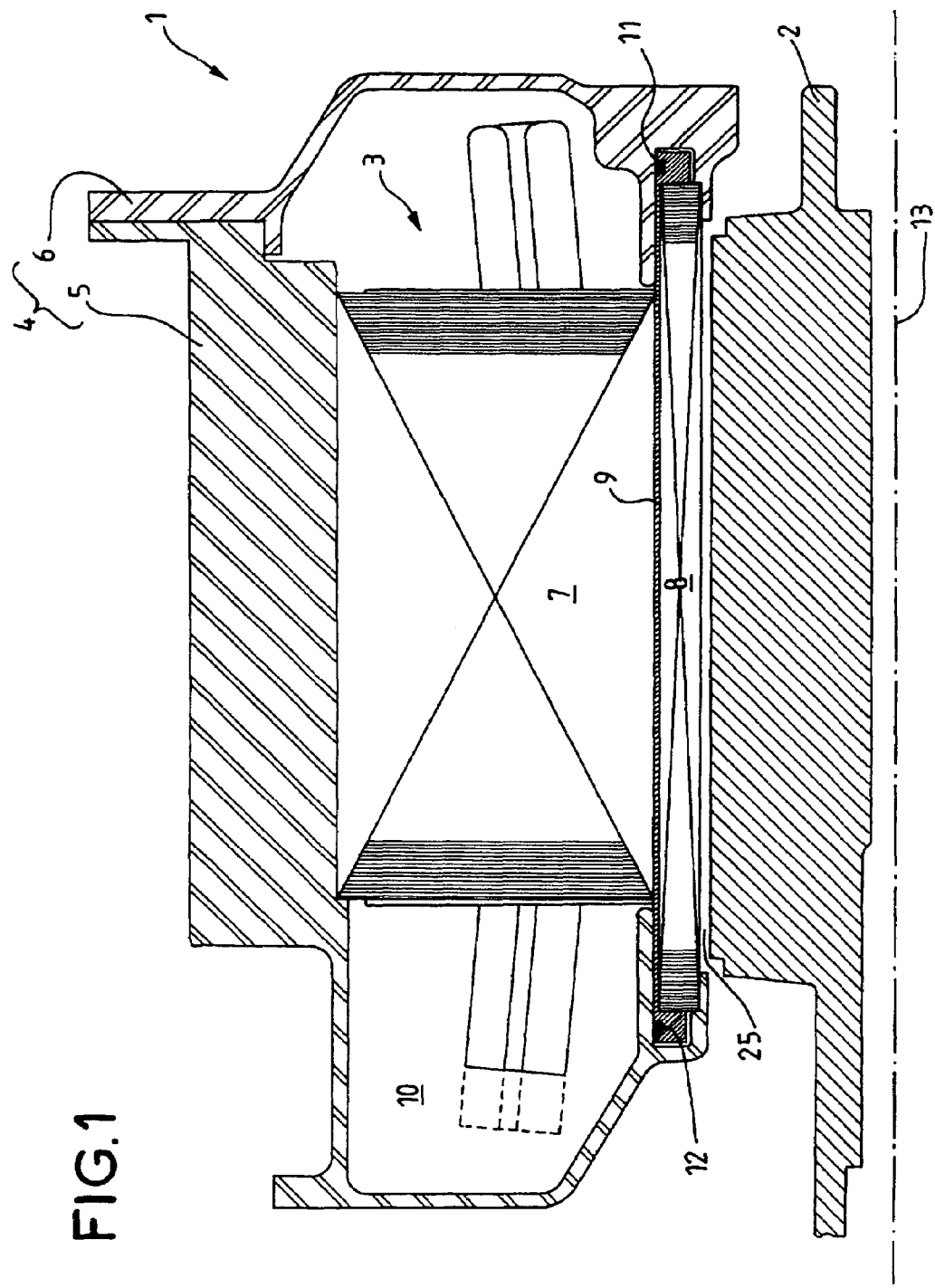
FIG. 1 represents, in partial section, an electric machine comprising a stator according to the invention.

FIG. 1 represents an electric machine 1 comprising a rotor 2 whose details are not represented, together with a stator 3 fastened to the inside of a housing 4 formed by two parts 5 and 6. The rotor 2 and the stator 3 are separated by a gap 25. The stator 3 comprises a two-part magnetic circuit whose parts 7 and 8 are separated by a shell 9. Thus, the shell 9 is sandwiched in the magnetic circuit. The housing 4 and the shell 9 form a fluidtight enclosure 10 inside which a fluid for cooling the stator 3 circulates. Oil is used as cooling fluid, for example. One or more O-ring seals may be placed between the housing 4 and the shell 9 to improve sealing at the interface between the shell 9 and the housing 4. In the example represented, two seals 11 and 12 have been used.

Advantageously, the shell 9 is of tubular shape and is centered around an axis 13 of revolution of the electric machine, and the magnetic circuit comprises a first stack of laminations 7 produced outside the shell 9 and a second stack of laminations 8 produced inside the shell 9. The laminations 7 and 8 are planar and perpendicular to the plane of FIG. 1.

Figure 2:
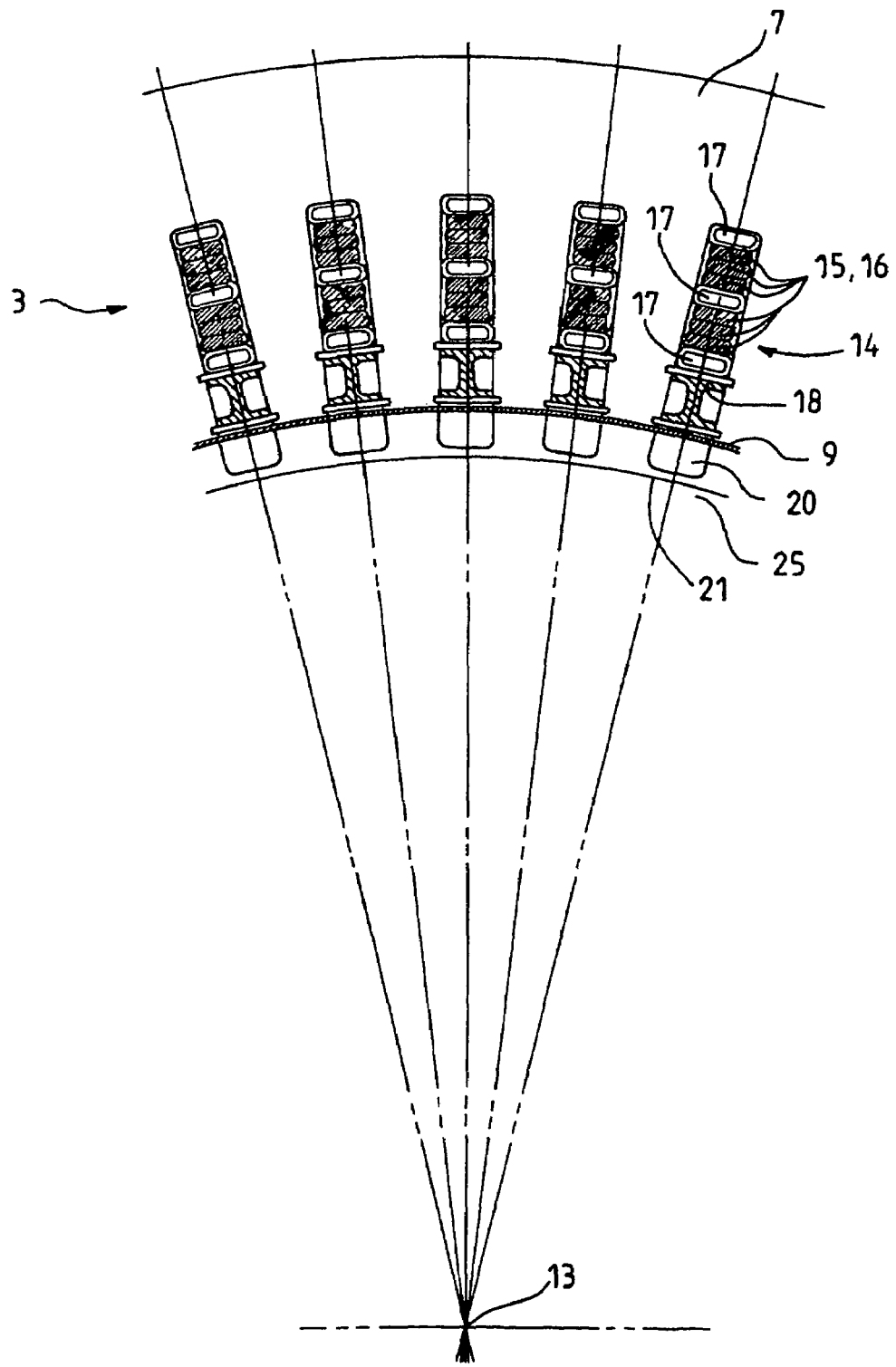
FIG. 2 represents an angular sector of the stator of FIG. 1, shown in section through a plane perpendicular to the section plane of FIG. 1.

FIG. 2 represents in section an angular sector of the stator 3 through a plane perpendicular to the axis 13. A complete view of the stator 3 can be obtained by duplicating the angular sector about the axis 13.

The first stack of laminations 7 comprises slots 14 inside which a winding 15 is arranged. The winding 15 is, for example, formed by copper bars 16 of rectangular cross section. The slots 14 advantageously have a constant width corresponding to the cross section of the bars 16. Passages 17 are advantageously made between the bars 16. The cooling fluid circulates in the passages 17 in order to cool the winding 15 and all of the stator 3. The winding is arranged at the bottom of the slots 14. The filling of each slot 14 may be completed by placing a block 18 made of an insulating material such as a glass-fiber-reinforced resin. The block 18 advantageously comprises passages 17 in order to improve the cooling of the stator 3.

The shell 9 is arranged between the first stack of laminations 7 and the second stack of laminations 8. Thus, the shell 9 is no longer directly exposed to the air in the gap 25 nor to its high temperature as in the prior art described above.

The second stack of laminations 8 also comprises slots 20 arranged in the continuation of the slots 14 of the first stack of laminations 7. Advantageously, the second stack of laminations 8 comprises bridges 21 which close the slots 20, the bridges 21 being situated in the immediate vicinity of the gap 25.

Using the bridges 21 to close the slots 20 constitutes a simple, direct alternative to fitting magnetic blocks in open, straight slots. These blocks would have had to be provided in any event in order in particular to greatly reduce the losses at the surface of the rotor 3, these losses being considerable in the case of a solid band. The bridges 21 are directly produced with the laminations of the second stack of laminations 8. This avoids possible contact faults between laminations forming open slots and magnetic blocks added to close the slots.

The second stack of laminations 8 may serve as a mechanical support for the shell 9. This allows the use of materials which do not have the mechanical properties of a shell of the prior art. For example, it is not necessary for the shell 9 to be self-supporting. A simple fluidtight coating may be used for example to form the shell 9. The coating is deposited on one of the stacks of laminations 7 or 8. Use is made, for example, of a composite material comprising glass fibers embedded in resin to produce the coating.

The position of the shell 9 with respect to the combined depth of the slots 14 and 20 may be adjusted as a function of the various production constraints, within a range corresponding to the height of that part of the stator 3 which is not filled with copper.

The invention claimed is:

1. A stator of an electric machine comprising:
an autonomous cooling circuit,
means for sealing the cooling circuit with respect to a rotor of the electric machine,
a magnetic circuit comprising slots, and
a winding arranged in the slots, wherein the stator comprises a two-part magnetic circuit whose parts are separated by a fluidtight shell, and wherein the stator comprises a two part magnetic circuit comprised of a major magnetic core portion disposed outboard of the fluidtight shell and a smaller minor magnetic core portion disposed inboard of the fluidtight shell.

2. The stator as claimed in claim 1, wherein the shell is of tubular shape and is centered around an axis of revolution of the electric machine.

3. The stator as claimed in claim 1, wherein the major magnetic core portion of the magnetic circuit comprises a first stack of laminations and the minor magnetic core portion comprises a second stack of laminations.

4. The stator as claimed in claim 3, wherein the first and the second stacks of laminations comprise the slots and in that the slots of the second stack of laminations are arranged in the continuation of the slots of the first stack of laminations.

5. The stator as claimed in claim 4, wherein the winding is completely situated in the slots of the first stack of laminations.

6. The stator as claimed in claim 5, wherein the second stack of laminations comprises bridges which close the slots of the second stack of laminations, the bridges being situated in the immediate vicinity of a gap of the electric machine.

7. The stator as claimed in claim 4, wherein the second stack of laminations comprises bridges which close the slots of the second stack of laminations, the bridges being situated in the immediate vicinity of a gap of the electric machine.

8. The stator as claimed in claim 1, wherein the shell is formed by a coating of one of the stacks of laminations.

9. The stator as claimed in claim 1, wherein the slots are formed in the major core portion.

10. The stator as claimed in claim 1, wherein the fluidtight shell forms part of the cooling circuit sealing means.

11. The stator as claimed in claim 1, wherein the cooling circuit comprises passages through which coolant flows, the passages being disposed within the slots.

12. A stator of an electric machine comprising:
an autonomous cooling circuit,
means for sealing the cooling circuit with respect to a rotor of the electric machine,
a magnetic circuit comprising slots, and
a winding arranged in the slots, wherein the stator comprises a two-part magnetic circuit whose parts are separated by a fluidtight shell,
wherein the magnetic circuit comprises a first stack of laminations produced outside the shell and a second stack of laminations produced inside the shell, and
wherein the shell is of tubular shape and is centered around an axis of revolution of the electric machine.

13. The stator as claimed in claim 12, wherein the stator comprises a two part magnetic circuit comprised of a major magnetic core portion disposed outboard of the fluidtight shell and a smaller minor magnetic core portion disposed inboard of the fluidtight shell.

14. The stator as claimed in claim 13, wherein the slots are formed in the major core portion.

15. The stator as claimed in claim 12, wherein the cooling circuit comprises passages through which coolant flows, the passages being disposed within the slots.

16. A stator of an electric machine comprising:
a cooling circuit,
fluidtight shell which is disposed inboard of the cooling circuit, said fluidtight shell forming part of a sealing arrangement which fluidtightly seals the cooling circuit from a rotor of the electric machine,
a magnetic circuit comprising slots, a first stack of laminations disposed outside the shell and a second stack of laminations disposed inside the shell, and
a winding arranged in the slots,
wherein the stator comprises a two-part magnetic circuit whose parts are separated by the fluidtight shell.

17. The stator as claimed in claim 16, wherein the shell is of tubular shape and is centered around an axis of revolution of the electric machine.

18. The stator as claimed in claim 16, wherein the stator comprises a two part magnetic circuit comprised of a major magnetic core portion disposed outboard of the fluidtight shell and a smaller minor magnetic core portion disposed inboard of the fluidtight shell.

19. The stator as claimed in claim 18, wherein the slots are formed in the major core portion.

20. The stator as claimed in claim 16, wherein the cooling circuit comprises passages through which coolant flows, the passages being disposed within the slots.

* * * * *